UNITED STATES PATENT OFFICE.

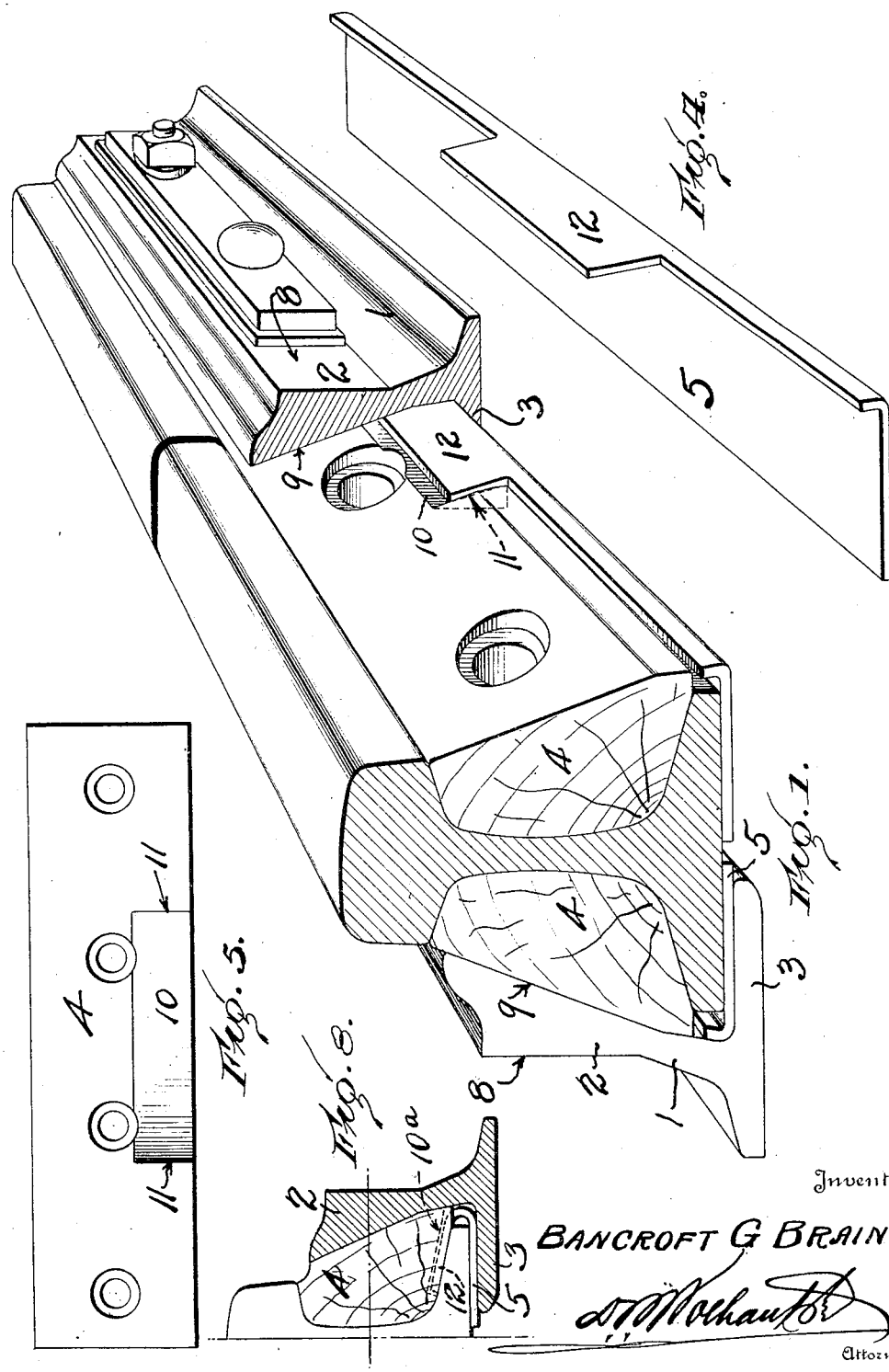

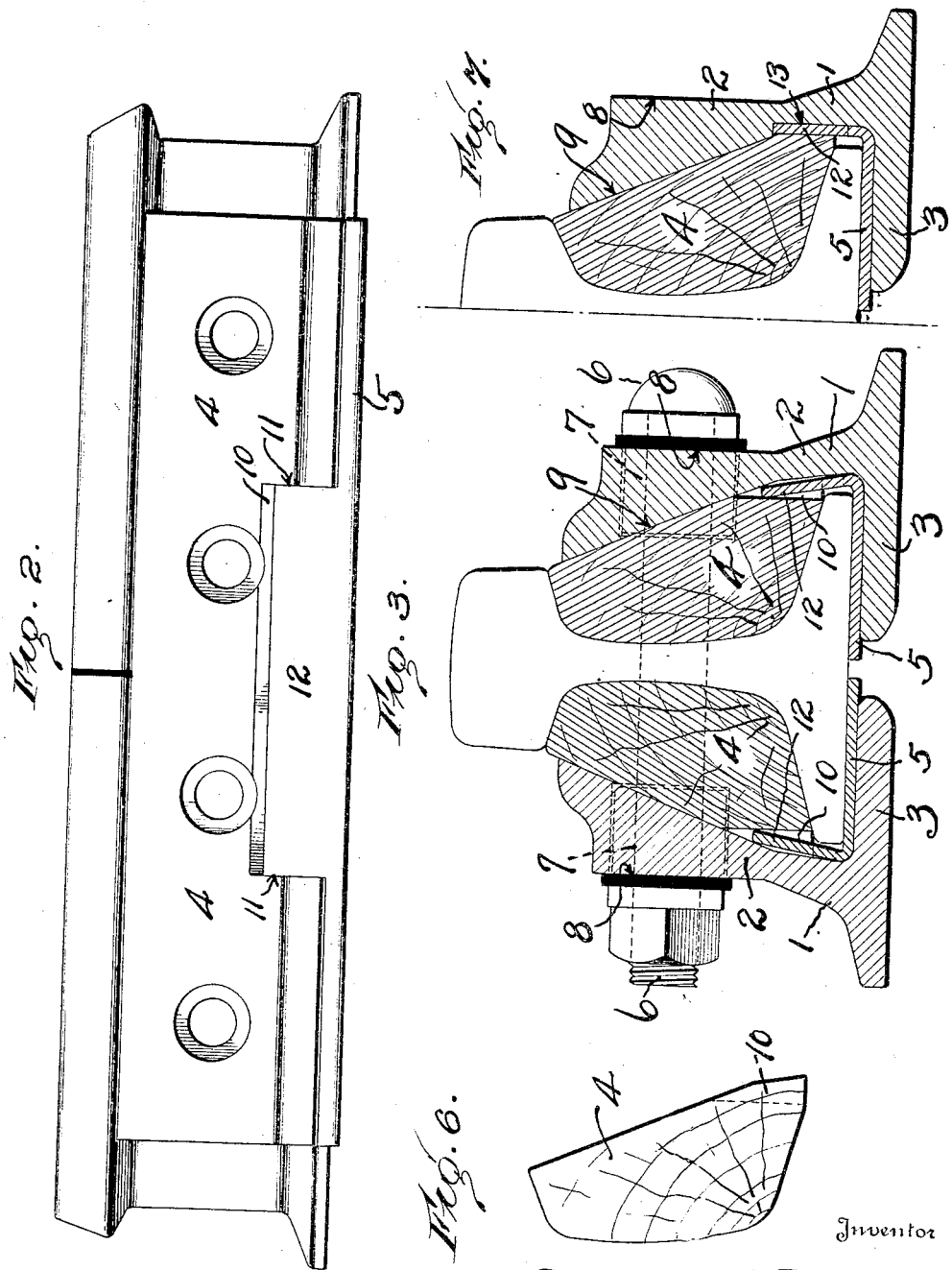

BANCROFT G. BRAINE, OF NEW YORK, N. Y., ASSIGNOR TO THE RAIL JOINT COMPANY, A CORPORATION OF NEW YORK.

INSULATED RAIL-JOINT.

1,240,660.  Specification of Letters Patent.  Patented Sept. 18, 1917.

Application filed June 20, 1917. Serial No. 175,946.

*To all whom it may concern:*

Be it known that I, BANCROFT G. BRAINE, a citizen of the United States, residing at New York city, in the county of New York and State of New York, have invented certain new and useful Improvements in Insulated Rail-Joints, of which the following is a specification.

This invention relates to insulation for rail joints of the insulated type, and particularly to a novel improvement for holding or locking the insulating material in place to secure the same against relative displacement or creeping under load conditions imposed thereon, thus contributing to the life of the insulation, and maintaining its proper insulating relation to the rails and to the joint parts.

Primarily, the invention contemplates the provision of positive and reliable locking means for securing the base fiber of an insulated joint in its proper insulating position within the joint to thereby entirely obviate the possibility of displacement thereof due to the usual causes, and at the same time providing a construction whereby a minimum amount of insulating material may be economically used to the best advantage both electrically and mechanically, and admitting of the ready removal and replacing of worn out pieces of insulation without materially disturbing or affecting the remainder of the joint, thus permitting of replacement without entirely dismembering the joint.

A further object of the invention is to provide improved fiber locking means for insulated rail joints which, though susceptible of more or less general application, possesses special utility in its application to that type of joint stucture employing both wooden filler blocks and fiber base insulation, in combination with metal shoe angles engaging the filler blocks beneath the rail base. In this form of construction the base fiber is clampingly held in place between the base members of the shoes and the rail base, and the frictional engagement of these parts is usually relied upon to maintain the fiber in its operative relation to the other parts of the joint. However, it has been found in practice that this frictional engagement of the parts immediately associated with the fiber insulation cannot be satisfactorily relied upon to hold such insulation in its proper position. A relative movement of the rails and joint parts under passing wheel loads and varying wheel thrusts has a tendency to cause displacement or creeping of the insulation sheets, and in order to entirely correct this tendency and to provide a thoroughly effectual and safe condition, the present invention provides for positively locking the insulation against longitudinal movement, thereby as stated, conserving its life and effectiveness.

Another distinctive object of the invention, as above indicated, is to provide a construction whereby the base fiber may be removed and replaced without entirely dismembering the joint. Usually repairs to insulated joints involving the replacing of insulation is made at points in the track where traffic must proceed as usual, and therefore it is undesirable to entirely dismember the joint. The present construction, however, is such that the insulation at the base of the joint may be removed and replaced without disturbing the positions of the wood fillers which clampingly engage the rails, thus leaving the joint parts substantially intact and capable of service.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a perspective view of an insulated joint of the character set forth, showing one of the shoe angles in section to better illustrate the means for interlocking the base insulation with the wood filler blocks.

Fig. 2 is a side elevation of a rail joint embodying the present improvement, with one of the joint bars removed.

Fig. 3 is a vertical cross sectional view of the joint at the center thereof, illustrating that form of the invention wherein the fiber lock is provided for by a direct interlocking engagement between the upstanding tongue of the fiber base and the filler block.

Fig. 4 is a detail in perspective of a fiber base piece embodying the improvements contemplated by the present invention.

Fig. 5 is a detail side elevation of one of the wooden filler blocks employed in the form of joint illustrated in Figs. 1 to 3 inclusive.

Fig. 6 is an end view of one of the filler blocks utilized in Figs. 1 to 5 inclusive.

Fig. 7 is a bi-sected sectional view of a modification that may be resorted to in the formation of the shoe angle to accommodate the tongue of the fiber to lock the same in position.

Fig. 8 is a detail view showing a further modification exemplifying the scope of the improvement.

Similar reference characters designate corresponding parts throughout the several figures of the drawings.

As above referred to, the present invention is susceptible of application to various types of insulated rail joints. The distinctive feature of the invention is to provide a fiber lock, located entirely within the joint and protected from outside influences, which will effectually secure the fiber against longitudinal displacement or creeping. This improvement however, possesses special advantage and utility in its application to that type of insulated rail joint utilizing wooden filler blocks, shoe angles and fiber base insulation interposed between the base members of the shoe angles and the base of the rail. Accordingly, for the purpose of illustration the invention is shown in the drawings as applied to that type of rail joint. As shown in the drawings, a joint of this type includes at each side the shoe angle 1 having the upright bolting member 2, and the inwardly extending horizontal base member 3, the insulating wooden filler block 4 fitting the fishing space of the rail and a base section of fiber insulation 5 which extends throughout the joint and is interposed between the base member of the shoe angle and the bottom of the rail.

This joint structure is held in its assembled relation by the joint bolts 6 passing through the usual bolt holes in the shoe, the wooden fillers and rail webs and supplied with suitable bolt insulation 7 to properly insulate the bolts from the shoe angles. The joint structure illustrated also is of a type wherein the upright bolting member 2 of each shoe angle is provided at its outer side with the vertical bolting face 8, and at its inner side with the inner inclined clamping face 9 which exerts a clamping force inwardly and downwardly upon the wooden filler blocks to thereby securely clamp the same in position, while at the same time assisting in the clamping engagement of the base member of the shoe beneath the rail base. These however are features of a special joint construction with which the present invention is preferably associated, and it will be understood that the claimed improvement is applicable to other joint structures embodying filler blocks and shoe angles.

Regardless of the particular details of construction of the joint proper, the present invention provides for locking the base fiber in such a manner that it will be held in its proper relation under all conditions of service and use. This improvement, in its preferable adaptation is characterized by the feature of interlocking the insulation plate 5 with the filler block 4 at a point below the bolt holes, by forming the insulation plate at a point intermediate its ends with an upstanding tongue which fits into and interlocks with a keeper recess provided in the filler block in an intermediate location, and conveniently in its outer lower corner.

Referring to the drawings illustrating these features of construction it will be observed that the keeper recess or keeper socket is designated by the reference number 10, and the same may be formed in the lower outer corner of the wooden filler block without in any way impairing its strength or disturbing the usual bearing face against which the shoe angle clamps, and the said keeper recess or socket presents at its ends the opposite abutment shoulders 11. These elements in the filler block, in the form of the invention being described, are engaged with the upstanding locking tongue 12 which projects upwardly from the outer edge portion of the insulation plate 5 at a point intermediate its ends. This tongue is adapted, when the parts are properly applied, to be seated in the recess or keeper socket 10 so that the arrangement of the parts provides a direct interlocking engagement between the tongue and the shoulders of the ends of the recess, thereby positively securing the fiber against longitudinal displacement or creeping. It will also be observed in this connection that the shoe angle acts as a retaining element fitting over the tongue 12 as well as the recess 10, and thereby maintaining the locked engagement of the fiber with the filler block, thus entirely obviating the possibility of any disengagement or displacement of the fiber until the bolts are loosened and the shoe angle is drawn away from the filler block.

A modification of the invention which can be resorted to is suggested in Figs. 6 and 7 of the drawings. This modification involves the idea of providing the upright member 2 of the shoe angle with a notch or recess 13 which interlocks the locking tongue 12 of the fiber.

Also as suggested in Fig. 8 of the drawings the purposes of the invention may be carried out with a form of construction wherein a keeper recess 10ª is formed in the medial portion of the under side of the filler block, immediately over the upper side of the flange of the rail and the intermediate locking tongue 12 of the base insulation plate is turned inwardly over the base flange to engage within and interlock with the said recess.

In addition to providing the desirable function of locking the base section of insulation against movement or creeping while in use, the present construction affords a simple and effective means for renewing the base insulation when necessary without dismembering the entire joint, thus retaining a valuable factor of safety for passing trains, in that the joint is only loose and not disassembled to any vital extent. That is to say, with the construction shown the removal and replacing of the base insulation would be effected by merely loosening the nuts on the joint bolts to permit the shoe to be drawn away sufficiently to allow the disengagement of the tongue from the recess of the filler or shoe angle upright after which the base fiber may be slipped out of the joint longitudinally without disturbing the positions of the wood fillers, and a new base section of insulation inserted in the same manner.

Without further description it is thought that the many features and advantages of the invention will be readily apparent, and it will of course be understood that minor changes in the form, proportion and other details of construction may be resorted to without departing from the spirit of the invention or scope of the appended claims.

I claim:

1. An insulated rail joint including the rail, a filler block, and the joint bar, of an insulation plate having an interlocked engagement with one of said parts to prevent longitudinal displacement.

2. An insulated rail joint including the rail, a filler block, and a joint bar clampingly engaging the filler block, and an insulation plate having a direct interlocked engagement with one of said parts and held so interlocked by the engagement of the bar with the block.

3. An insulated rail joint including the rail, a filler block, a joint bar clampingly engaging the filler block, and an insulation plate interposed between the rail and between the bar and the filler block, such insulation plate having a direct interlocked engagement with one of said parts.

4. An insulated rail joint including a filler block having a shouldered recess, and an insulation plate having a member held in locked position within the said recess.

5. An insulated rail joint including the rail, a filler block having a shouldered recess, a joint bar engaging the filler block, and an insulation plate having a member held in locked position within the recess by the joint bar.

6. An insulated rail joint including the rail, a filler block having at its bottom corner an intermediate recess, a shoe angle, and an insulation plate interposed between the shoe angle and the rail base and having a member held interlocked within the recess by the upright member of the shoe angle.

7. An insulated rail joint including the rail, a filler block, a shoe angle, and a base section of insulation having a direct locked engagement with the filler block and held clamped between the shoe and the rail.

8. An insulated rail joint including the rail, the filler block having a recess in its outer lower corner below the bolt holes, a shoe angle, and a base secton of insulation having a member engaged within said recess.

9. An insulated rail joint including the rail, a filler block having a recess below the bolt holes, a shoe angle, and a base section of insulation having an upstanding tongue interlocked with said recess.

10. An insulated rail joint including the rail, a filler block having a recess below the bolt holes, a shoe angle, and a base section of insulation confined within the shoe angle and having an upstanding tongue held in locking position within said recess by the shoe angle.

In testimony whereof I hereunto affix my signature in the presence of two witnesses.

BANCROFT G. BRAINE.

Witnesses:
E. K. KERSHNER,
C. A. DISBROW.